(12) United States Patent
Yin et al.

(10) Patent No.: US 9,918,064 B2
(45) Date of Patent: Mar. 13, 2018

(54) METHOD AND APPARATUS FOR PROVIDING REDUCED RESOLUTION UPDATE MODE FOR MULTI-VIEW VIDEO CODING

(71) Applicant: THOMSON LICENSING, Issy de Moulineaux (FR)

(72) Inventors: Peng Yin, Ithaca, CA (US); Yeping Su, Cupertino, CA (US); Cristina Gomila Torres, Cesson-Sevigne (FR)

(73) Assignee: THOMSON LICENSING DTV, Issy les Moulineaux (FR)

( * ) Notice: Subject to any disclaimer, the term of this patent is extended or adjusted under 35 U.S.C. 154(b) by 815 days.

(21) Appl. No.: 14/308,525

(22) Filed: Jun. 18, 2014

(65) Prior Publication Data

US 2015/0003522 A1    Jan. 1, 2015

Related U.S. Application Data

(62) Division of application No. 12/086,206, filed as application No. PCT/US2007/000448 on Jan. 5, 2007, now abandoned.

(Continued)

(51) Int. Cl.
| | |
|---|---|
| *H04N 13/00* | (2018.01) |
| *H04N 19/597* | (2014.01) |
| *H04N 19/159* | (2014.01) |
| *H04N 19/176* | (2014.01) |
| *H04N 19/70* | (2014.01) |

(Continued)

(52) U.S. Cl.
CPC ....... *H04N 13/0007* (2013.01); *H04N 19/117* (2014.11); *H04N 19/159* (2014.11); *H04N 19/174* (2014.11); *H04N 19/176* (2014.11); *H04N 19/46* (2014.11); *H04N 19/50* (2014.11); *H04N 19/51* (2014.11); *H04N 19/59* (2014.11); *H04N 19/597* (2014.11);

(Continued)

(58) Field of Classification Search
CPC ...................................................... H04N 13/07
USPC ..................................................... 375/240.29
See application file for complete search history.

(56) References Cited

U.S. PATENT DOCUMENTS

| | | | | |
|---|---|---|---|---|
| 2002/0176508 A1* | 11/2002 | Boyce | ....................... | G06T 3/40 |
| | | | | 375/240.25 |
| 2007/0025448 A1* | 2/2007 | Cha | ....................... | H04N 19/159 |
| | | | | 375/240.24 |
| 2007/0172133 A1* | 7/2007 | Kim | ....................... | H04N 1/41 |
| | | | | 382/232 |

FOREIGN PATENT DOCUMENTS

| | | | |
|---|---|---|---|
| EP | 0883300 A2 | 9/1998 | |
| WO | 2005093661 A2 | 10/2005 | |
| WO | WO 2005093661 A2 * | 10/2005 | ........... H04N 19/176 |

OTHER PUBLICATIONS

Anantrasirichai, N. et al, "Multi-View Image Coding with Wavelet Lifting and In-Band Disparity Compensation," Image Processing, 2005, ICIP, 2005, IEEE International Conference in Genova, Italy. Sep. 11-14, 2005, Piscataway, NJ, pp. 1-4, XP01851389.

(Continued)

*Primary Examiner* — Yulin Sun
(74) *Attorney, Agent, or Firm* — Tutunjian & Bitettto, P.C.

(57) ABSTRACT

There are provided a method and apparatus for providing reduced resolution update mode for multi-view video coding. A video encoder includes an encoder for encoding a picture using a reduced resolution update mode. The picture is one of a set of pictures corresponding to multi-view content having different view points with respect to a same or similar scene. The picture represents one of the different view points.

10 Claims, 9 Drawing Sheets

Related U.S. Application Data

(60) Provisional application No. 60/757,291, filed on Jan. 9, 2006, provisional application No. 60/757,289, filed on Jan. 9, 2006.

(51) Int. Cl.
  *H04N 19/46* (2014.01)
  *H04N 19/51* (2014.01)
  *H04N 19/61* (2014.01)
  *H04N 19/117* (2014.01)
  *H04N 19/174* (2014.01)
  *H04N 19/86* (2014.01)
  *H04N 19/59* (2014.01)
  *H04N 19/50* (2014.01)
  *H04N 19/80* (2014.01)

(52) U.S. Cl.
  CPC .............. *H04N 19/61* (2014.11); *H04N 19/70* (2014.11); *H04N 19/80* (2014.11); *H04N 19/86* (2014.11)

(56) References Cited

OTHER PUBLICATIONS

Comer, M., "Reduced Resolution Update Video Coding with Interblock Filtering of Prediction Error Residuals," Image Processing, 2005, ICIP 2005, International Conference in Genova, Italy, Sep. 11-14, 2005, Piscataway, NJ, pp. 61-64, XP002436764.

Li, S., et al., "Approaches to H.264-Based Stereoscopic Video Coding," Proceedings of the Third International Conference on Image and Graphics (ICIG'04) Dec. 18-20, 2004, Hong Kong, China, pp. 1-4.

International Telecommunication Union, "Video Coding for Low Bit Rate Communication," Series H: Audiovisual and Multimedia Systems, Infrastructure of audiovisual service—Coding of moving video, ITU-T Recommendation H.263, Feb. 6, 1998, pp. 1-20.

Tourapis, A. et al., "New Results on Reduced Resolution Update Mode," ITU-T Video Coding Experts Group (ITU-T SG16Q.6), 12th Meeting: Redmond, Washington, USA Jul. 19-23, 2004, Document: VCEG-W04, Thomson, pp. 1-15.

Tourapis, a, et al., "Reduced Resolution Update Mode for Advanced Video Coding," ITU-T Video Coding Experts Group (ITU-T SG16Q.6) 22nd Meeting: Munich, DE, Mar. 15-19, 2004, Document: VCEG-V05, Thomson, pp. 1-15.

Tourapis, a. et al., "Reduced Resolution Slice Update Mode for Advanced Video Coding," Text U.S. Appl. No. 60/551,417 dated Mar. 9, 2004, pp. 1-19.

Yang, W., et al., "Scalable Multiview Video Coding Using Wavelet," Circuits and Systems, 2005, ISCAS 2005, IEE International Symposium in Kobe, Japan, May 23-26, 2005, Piscataway, NJ, pp. 6078-6081, XP010816922.

Yin, P., et al, "A New Intra Prediction Metod for RRU," ITU-T Video Coding Experts Group (ITU-T SG16Q.6), 14th Meeting, Hong Kong, Jan. 17-21, 2004, pp. 1-4, XP002375193.

\* cited by examiner

METHOD AND APPARATUS FOR PROVIDING REDUCED RESOLUTION UPDATE MODE FOR MULTI-VIEW VIDEO CODING

CROSS-REFERENCE TO RELATED APPLICATIONS

This application claims the benefit, under 35 U.S.C. § 365 of international Application PCT/US2007/000448, filed 5 Jan. 2007, which was published in accordance with PCT Article 21(2) on 19 Jul. 2007, in English and which claims the benefit of U.S. provisional patent application No. 60/757,291 filed 9 Jan. 2006 and U.S. provisional patent application No. 60/757,289 filed 9 Jan. 2006, which are each incorporated by reference herein in their respective entireties.

FIELD OF THE INVENTION

The present invention relates generally to video encoding and decoding and, more particularly, to a method and apparatus for providing a reduced resolution update mode for Multi-view Video Coding (MVC).

BACKGROUND OF THE INVENTION

A Multi-view Video Coding (MVC) sequence is a set of two or more video sequences that capture the same scene from a different view point. A possible approach to the encoding of a multi-view video sequence is to encode each single view independently. In this case, any existing video coding standard, as for example, the International Telecommunication Union, Telecommunication Sector (ITU-T) H.263 recommendation (hereinafter the "H.263 Recommendation") and the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard") can be used. The approach has low compression efficiency since it only exploits the temporal redundancy between pictures of the same video sequence.

The Reduced-Resolution Update mode was introduced in the H.263 Recommendation to allow an increase in the coding picture rate while maintaining sufficient subjective quality. Although the syntax of a bitstream encoded in this mode was essentially identical to a bitstream coded in full resolution, the main difference was on how all modes within the bitstream were interpreted, and how the residual information was considered and added after motion compensation. More specifically, an image in this mode had ¼ the number of macroblocks compared to a full resolution coded picture, while motion vector data was associated with block sizes of 32×32 and 16×16 of the full resolution picture instead of 16×16 and 8×8, respectively. On the other hand, discrete cosine transform (DCT) and texture data are associated with 8×8 blocks of a reduced resolution image, while an upsampling process is required in order to generate the final full image representation.

Although this process could result in a reduction in objective quality, this is more than compensated from the reduction of bits that need to be encoded due to the reduced number (by 4) of modes, motion data, and residuals. This is especially important at very low bit rates where modes and motion data can be considerably more than the residual. Subjective quality was also far less impaired compared to objective quality. Also, this process can be seen as somewhat similar to the application of a low pass filter on the residual data prior to encoding, which, however, requires the transmission of all modes, motion data, and filtered residuals, thus being less efficient.

Some notable differences of the RRU mode compared to normal encoding are the consideration of larger block sizes and the subsampling of the residual prior to encoding. The first difference allows for a significant overhead reduction within the bitstream (critical for lower bit rates), while the second difference can be seen as a "spatial" quantization process.

More specifically, to support RRU within the syntax of the MPEG-4 AVC standard, a new slice parameter (reduced_resolution_update) was introduced according to which the current slice is subdivided into (RRUwidth*16)× (RRUheight*16) size macroblocks. Unlike the H.263 Recommendation, it is not necessary for RRUwidth to be equal to RRUheight. Additional slice parameters can be included, more specifically rru_width_scale=RRUwidth and rru_height_scale=RRUheight which allow us to reduce resolution horizontally or vertically at any desired ratio. Possible options, for example, include scaling by 1 horizontally & 2 vertically (MBs are of size 16×32), 2 vertically & 1 horizontally (MB size 32×16), or, in general, to have macroblocks of size (rru_width_scale*16)×(rru_height_scale*16).

In a special case, for example, RRUwidth=RRUheight=2 and the RRU slice macroblocks will then be of size 32×32. In this case, all macroblock partitions and sub-partitions have to be scaled by 2 horizontally and 2 vertically. Turning to FIG. 1, a diagram for exemplary macroblock partitions 100 and sub-macroblock partitions 150 in a Reduced Resolution Update (RRU) mode is indicated generally by the reference numeral 100. Unlike the H.263 Recommendation, where motion vector data had to be divided by 2 to conform to the standards specifics, this is not necessary in the MPEG-4 AVC standard and motion vector data can be coded in full resolution/subpel accuracy. Skipped macroblocks in P slices in this mode are considered as of having a 32×32 size, while the process for computing their associated motion data remains unchanged, although obviously we need to now consider 32×32 neighbors instead of 16×16.

Another key difference of this extension, although optional, is that in the MPEG-4 AVC standard, texture data does not have to represent information from a lower resolution image. Since intra coding in the MPEG-4 AVC standard is performed through the consideration of spatial prediction methods using either 4×4 or 16×16 block sizes, this can be extended, similarly to inter prediction modes, to 8×8 and 32×32 intra prediction block sizes. Prediction modes nevertheless remain more or less the same, although now more samples are used to generate the prediction signal.

The residual data is then downsampled and is coded using the same transform and quantization process already available in the MPEG-4 AVC standard. The same process is applied for both Luma and Chroma samples. During decoding, the residual data needs to be upsampled. The downsampling process is done only in the encoder and, hence, does not need to be standardized. The upsampling process must be matched in the encoder and the decoder, and so must be standardized. Possible upsampling methods that could be used are the zero or first order hold or by considering a similar strategy as in the H.263 Recommendation.

The MPEG-4 AVC standard also considers an in-loop deblocking filter, applied to 4×4 block edges. Since currently the prediction process is applied to block sizes of 8×8 and above, this process is modified to consider 8×8 block edges instead.

Different slices in the same picture may have different values of reduced_resolution_update, rru_width_scale and rru_height_scale. Since the in-loop deblocking filter is applied across slice boundaries, blocks on either side of the slice boundary may have been coded at different resolutions. In this case, we need to consider for the deblocking filter parameters computation, the largest quantization parameter (QP) value among the two neighboring 4×4 normal blocks on a given 8×8 edge, while the strength of the deblocking is now based on the total number of non-zero coefficients of the two blocks.

To support Flexible Macroblock Ordering as indicated by num_slice_groups_minus1 greater than 0 in the picture parameter sets, with the Reduced Resolution Update mode, an additional parameter referred to as reduced_resolution_update_enable is transmitted in the picture parameter set. It is not allowed to encode a slice using the Reduced Resolution Mode if FMO is present and this parameter is not set. Furthermore, if this parameter is set, the parameters rru_max_width_scale and rru_max_height_scale should also be transmitted. These parameters ensure that the map provided can always support all possible Reduced Resolution Update macroblock sizes. This means that the following parameters should conform to the following conditions:

max_width_scale % rru_width_scale=0, max_height_scale % rru_height_scale=0 and, max_width_scale>0,max_height_scale>0.

The FMO slice group map that is transmitted corresponds to the lowest allowed reduced resolution, corresponding to rru_max_width_scale and rru_max_height_scale. Note that if multiple macroblock resolutions are used then rru_max_width_scale and rru_max_height_scale need to be multiples of the least common multiple of all possible resolutions within the same picture.

Direct modes in the MPEG-4 AVC standard are affected depending on whether the current slice is in reduced resolution mode, or the list1 reference is in reduced resolution mode and the current one is not. For the direct mode case, when the current picture is in reduced resolution and the reference picture is in full resolution, a similar method is borrowed from that is currently employed within the MPEG-4 AVC standard when direct_8x8_inference_flag is enabled. According to this method, co-located partitions are assigned by considering only the corresponding corner 4×4 blocks (corner is based on block indices) of an 8×8 partition. In our case if direct belongs to a reduced resolution slice, motion vectors and references for the co-located partitions are derived as if direct_8x8_inference_flag was set to 1. This can be seen also as a downsampling of the motion field of the co-located reference. Although not necessary, if direct_8x8_inference_flag was already set within the bitstream, this process could be applied twice. For the case when the current slice is not in reduced resolution mode, but its first list1 reference is, all motion data of this reduced resolution reference is to be first upsampled. Motion data can be upsampled using zero order hold, which is the method with the least complexity. Other filtering methods, for example similar to the process used for the upsampling of the residual data, or first order hold, could also be used.

Some other tools of the MPEG-4 AVC standard are also affected due to the consideration of this mode. More specifically, macroblock adaptive field frame mode (MB-AFF) needs to be now considered using a 32×64 super-macroblock structure. The upsampling process is performed on individual coded block residuals. If an entire picture is coded in field mode, then the corresponding block residuals are coded in field mode and, hence, the upsampling is also done in fields. Similarly, when MB-AFF is used, individual blocks are coded either in field of frame mode, and their corresponding residuals are upsampled in field or frame mode respectively.

To allow the reduced resolution mode to work for all possible resolutions, a picture is always extended vertically and horizontally in order to be always divisible by 16*rru_height_scale and 16*rru_width_scale, respectively. For the example where rru_height_scale=rru_width_scale=2, the original resolution of an image was $H_R \times V_R$ and the image is padded to a resolution equal to $H_C \times V_C$ where:

$$H_C = ((H_R+31)/32)*32$$

$$V_C = ((V_R+31)/32)*32$$

The process for extending the image resolution is similar to what is currently done for the MPEG-4 AVC standard to extend the picture size to be divisible by 16.

A similar approach is used for extending chroma samples, but to half of the size.

SUMMARY OF THE INVENTION

These and other drawbacks and disadvantages of the prior art are addressed by the present invention, which is directed to a method and apparatus for providing a reduced resolution update mode for Multi-view Video Coding (MVC).

According to an aspect of the present invention, there is provided a video encoder. The video encoder includes an encoder for encoding a picture using a reduced resolution update mode. The picture is one of a set of pictures corresponding to multi-view content having different view points with respect to a same or similar scene. The picture represents one of the different view points.

According to another aspect of the present invention, there is provided a video encoding method. The method includes encoding a picture using a reduced resolution update mode. The picture is one of a set of pictures corresponding to multi-view content having different view points with respect to a same or similar scene, the picture representing one of the different view points.

According to yet another aspect of the present invention, there is provided a video decoder. The video decoder includes a decoder for decoding a picture using a reduced resolution update mode. The picture is one of a set of pictures corresponding to multi-view content having different view points with respect to a same or similar scene. The picture represents one of the different view points.

According to a further aspect of the present invention, there is provided a video decoding method. The method includes decoding a picture using a reduced resolution update mode. The picture is one of a set of pictures corresponding to multi-view content having different view points with respect to a same or similar scene, the picture representing one of the different view points.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
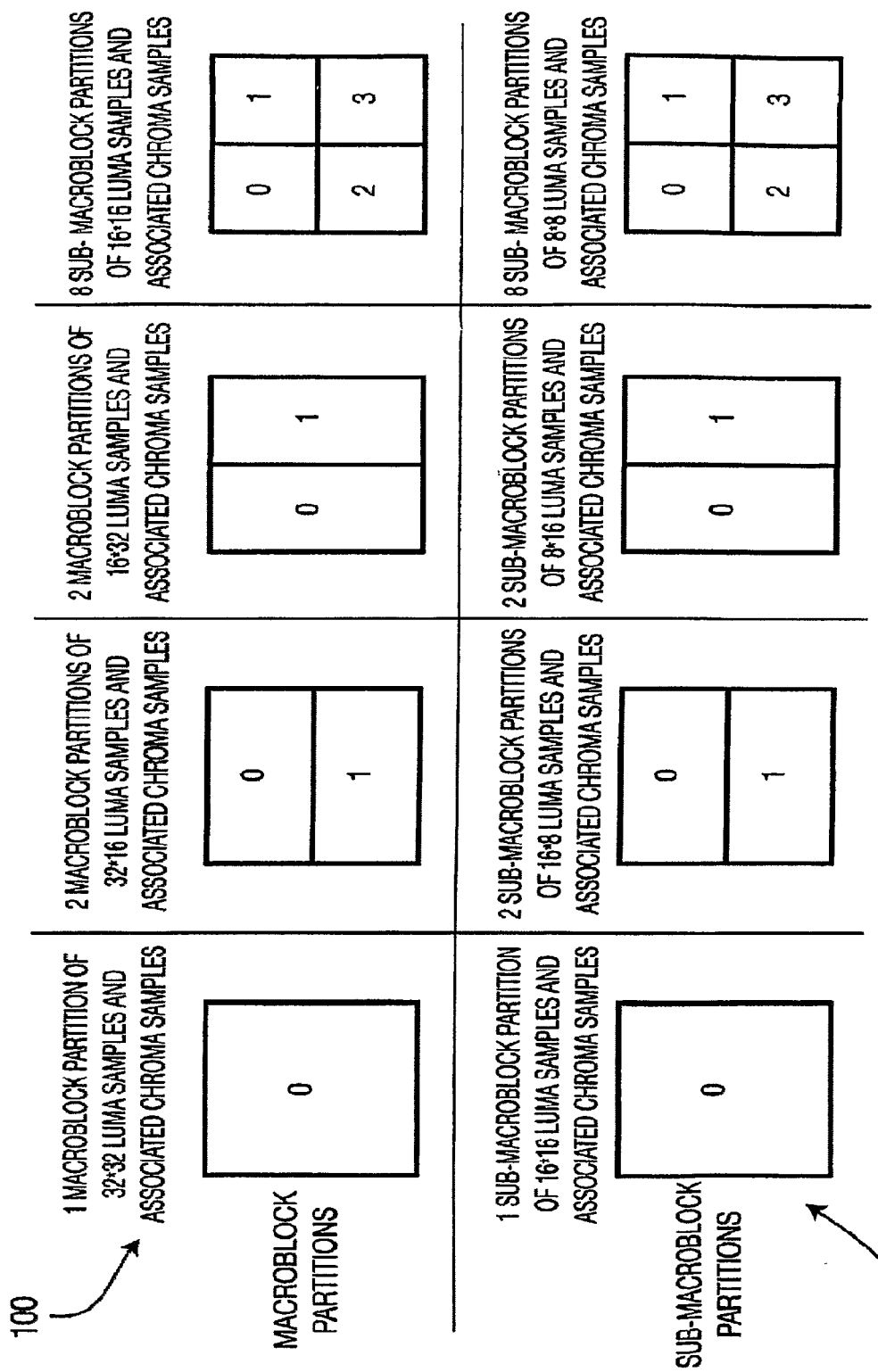
FIG. 1 is a block diagram for exemplary macroblock and sub-macroblock partitions in a Reduced Resolution Update (RRU) mode.

The present invention is directed to a method and apparatus for providing a reduced resolution update mode for Multi-view Video Coding (MVC).

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" or "another embodiment" of the present principles means that a particular feature, structure, characteristic, and so forth described in connection with the embodiment is included in at least one embodiment of the present principles. Thus, the appearances of the phrase "in one embodiment" or "in an embodiment" or "in another embodiment" appearing in various places throughout the specification are not necessarily all referring to the same embodiment.

Figure 2:
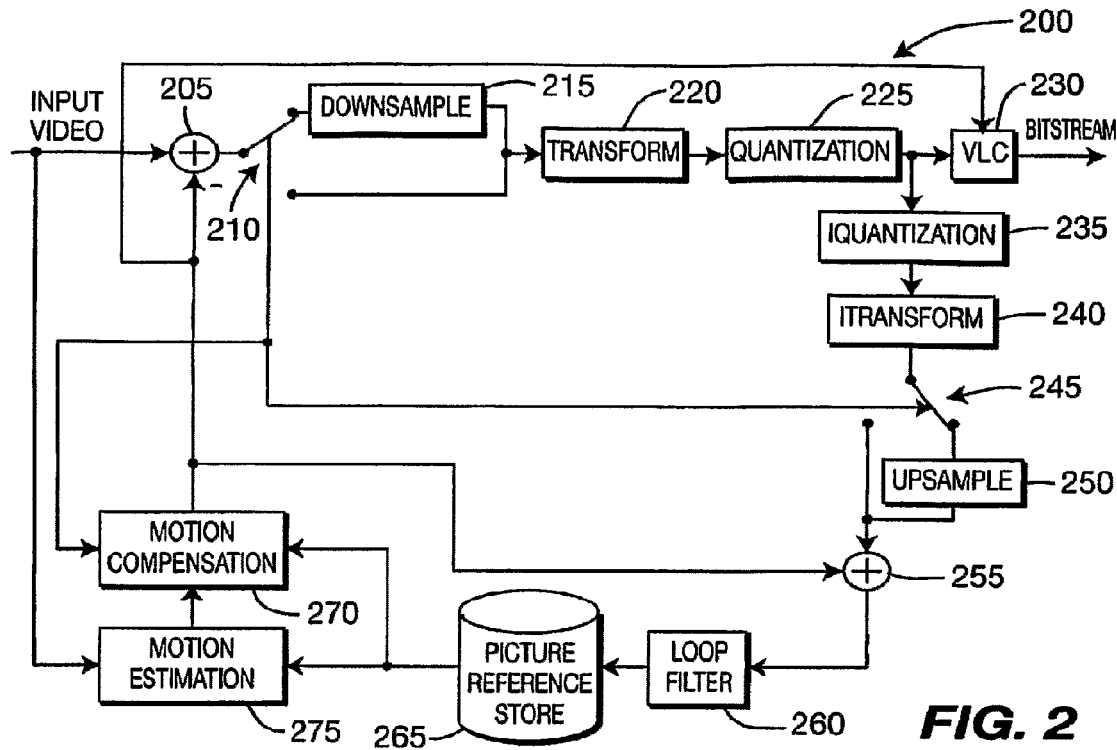
FIG. 2 is a block diagram for an exemplary encoder supporting reduced resolution update mode to which the present principles may be applied in accordance with an embodiment of the present principles.

Turning to FIG. 2, an exemplary encoder supporting Reduced Resolution Update (RRU) mode is indicated generally by the reference numeral 200. The encoder 200 includes a combiner 205 having an output connected to an input of a switch 210. A first output of the switch 210 is connected in signal communication with an input of a downsampler 215, a first output of a switch 245 and a first input of a motion compensator 270. An output of the downsampler 215 is connected in signal communication with an input of a transformer 220. A second output of the switch 210 is connected in signal communication with the input of the transformer 220. An output of the transformer 220 is connected in signal communication with an input of a quantizer 225. An output of the quantizer 225 is connected in signal communication with a first input of a variable length coder 230 and an input of an inverse quantizer 235. An output of the inverse quantizer 235 is connected in signal communication with an input of an inverse transformer 240. An output of the inverse transformer 240 is connected in signal communication with an input of the switch 245. A first output of the switch 245 is connected in signal communication with an input of an upsampler 250. An output of the upsampler 250 is connected in signal communication with a first non-inverting input of a combiner 255. A second output of the switch 245 is connected in signal communication with the first non-inverting input of the combiner 255. An output of the combiner 255 is connected in signal communication with an input of a loop filter 260. An output of the loop filter 260 is connected in signal communication with an input of a reference picture store 265. An output of the reference picture store 265 is connected in signal communication with a second input of a motion compensator 270 and a first input of a motion estimator 275. An output of the motion estimator 275 is connected in signal communication with a third input of the motion compensator 270. An output of the motion compensator 270 is connected in signal communication with a second non-inverting input of the combiner 255, an inverting input of the combiner 205, and a second input of the variable length coder 230. A second input of the motion estimator 275 and a non-inverting input of the combiner 205 are available as an input of the encoder 200. An output of the variable length coder 230 is available as an output of the encoder 200.

Figure 3:
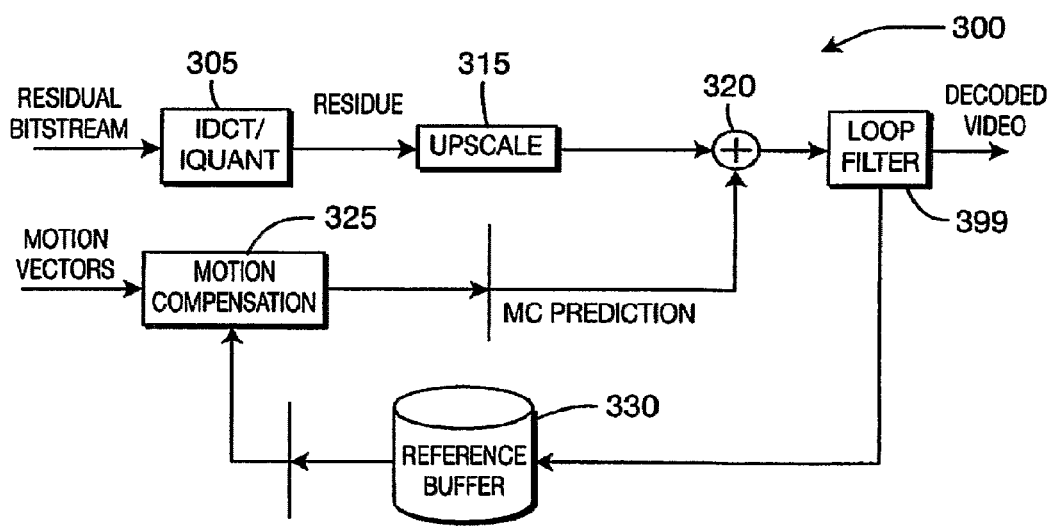
FIG. 3 is a block diagram for an exemplary decoder supporting Reduced Resolution Update (RRU) mode to which the present principles may be applied in accordance with an embodiment of the present principles.

Turning to FIG. 3, an exemplary decoder supporting Reduced Resolution Update (RRU) mode is indicated generally by the reference numeral 300. An input of an inverse discrete cosine transformer (IDCT)/inverse quantizer (IQuant) 305 is available as an input of the decoder 300, for receiving a residual bitstream. An input of a motion compensator 325 is also available as an input of the decoder 300, for receiving motion vectors.

An output of the inverse discrete cosine transformer/inverse quantizer 305 is connected in signal communication with an input of an upscaler 315. An output of the upscaler 315 is connected in signal communication with a first non-inverting input of a combiner 320. An output of the combiner 320 is connected in signal communication with an input of a loop filter 399. A first output of the loop filter 399 is connected in signal communication with an input of a reference buffer 330. An output of the reference buffer 330 is connected in signal communication with an input of a motion compensator 325. An output of the motion compensator 325 is connected in signal communication with a second non-inverting input of the combiner 320. A second output of the loop filter 399 is available as an output of the decoder 300, and provides the decoded video. An output of the inverse discrete cosine transformer/inverse quantizer 305 provides a residue(s). An output of the reference picture buffer 330 provides a reference picture(s). An output of the motion compensator provides a motion compensated prediction(s).

The model involving the encoder 200 and decoder 300 can be extended and improved by using additional processing elements, such as spatio-temporal analysis in both the encoder and decoder, which would allow us to remove some of the artifacts introduced through the residual downsampling and upsampling process.

Figure 4:
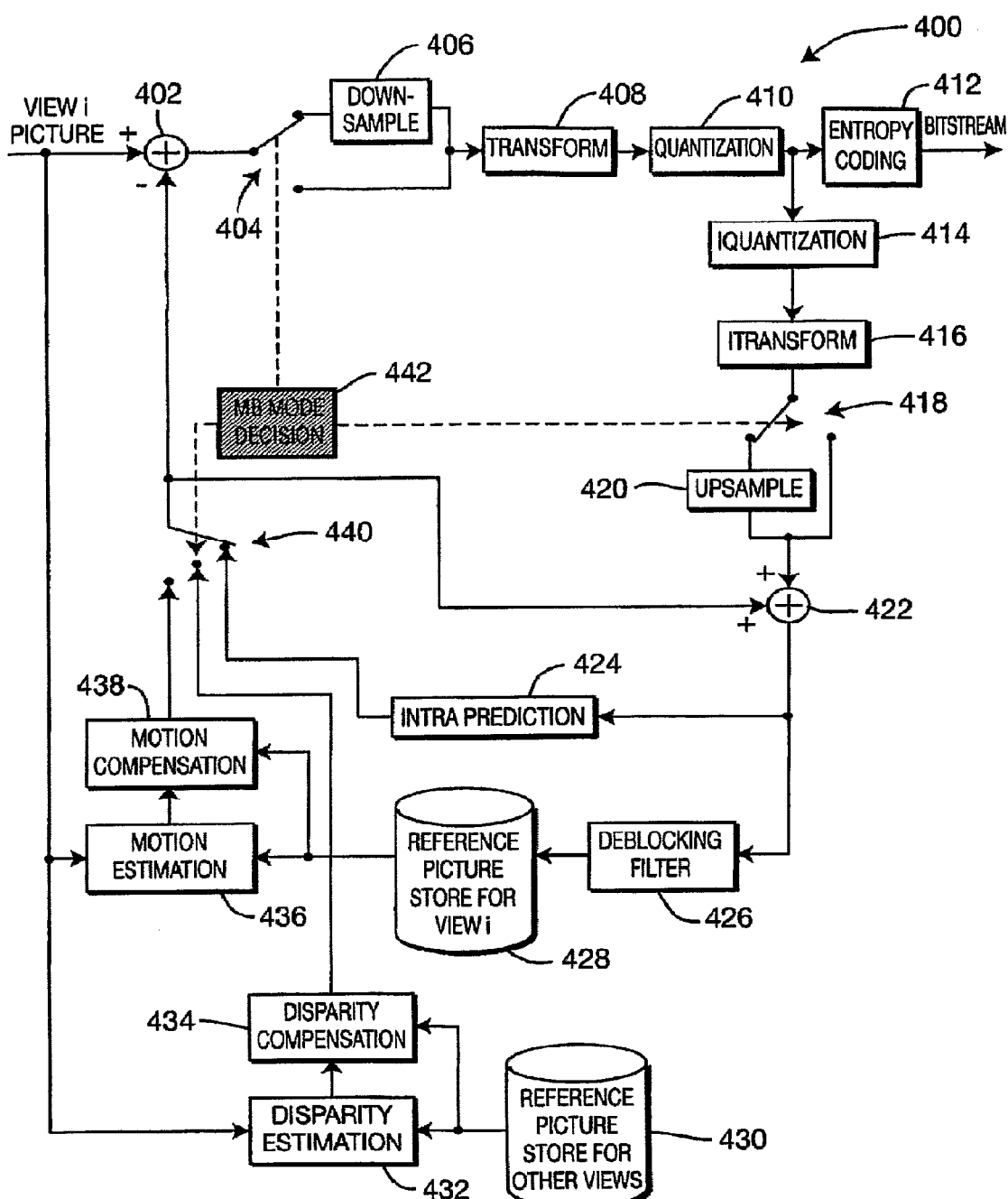
FIG. 4 is a block diagram for a Multi-view Video Coding (MVC) encoder supporting reduced resolution update mode to which the present principles may be applied in accordance with an embodiment of the present principles.

Turning to FIG. 4, a Multi-view Video Coding (MVC) encoder supporting reduced resolution update mode is indicated generally by the reference numeral 400. The encoder 400 includes a combiner 402 having an output connected in signal communication with an input of a switch 404. A first output of the switch 404 is connected in signal communication with an input of a downsampler 406. A second output of the switch 404 is connected in signal communication with an input of a transformer 408. The output of the downsampler 406 is connected in signal communication with the input of the transformer 408. An output of the transformer 408 is connected in signal communication with an input of a quantizer 410. An output of the quantizer 410 is connected in signal communication with an input of an entropy coder 412 and an input of an inverse quantizer 414. An output of the inverse quantizer 414 is connected in signal communication with an input of an inverse transformer 416. An output of the inverse transformer 416 is connected in signal communication with an input of a switch 418. A first output of the switch 418 is connected in signal communication with an input of an upsampler 420. A second output of the switch 418 is connected in signal communication with a first non-inverting input of a combiner 422. The output of the upsampler 420 is connected in signal communication with the first non-inverting input of the combiner 422. An output of the combiner 422 is connected in signal communication with an input of an intra predictor 424 and an input of a deblocking filter 426. An output of the deblocking filter 426 is connected in signal communication with an input of a reference picture store 428 (for view i). An output of the reference picture store 428 is connected in signal communication with a first input of a motion estimator 436 and a first input of a motion compensator 438. An output of the motion estimator 436 is connected in signal communication with a second input of the motion compensator 438.

An output of a reference picture store 430 (for other views) is connected in signal communication with a first input of a disparity estimator 432 and a first input of a disparity compensator 434. An output of the disparity estimator 432 is connected in signal communication with a second input of the disparity compensator 434.

An inverting input of the combiner 402 is connected in signal communication with an output of a switch 440. The output of the switch 440 is also connected in signal communication with a second non-inverting input of the combiner 422. A first input of the switch 440 is connected in signal communication with an output of the intra predictor 424. A second input of the switch 440 is connected in signal communication with an output of the disparity compensator 434. A third input of the switch 440 is connected in signal communication with an output of the motion compensator 438. A first output of a macroblock (MB) mode decision module 442 is connected in signal communication with the switch 404 for controlling which input is selected by the switch 402. A second output of the macroblock mode decision module 442 is connected in signal communication with the switch 418 for controlling which output is selected by the switch 418. A third output of the macroblock mode decision module 442 is connected in signal communication with the switch 440 for controlling which input is selected by the switch 440.

An input of the encoder 400 is connected in signal communication with a non-inverting input of the combiner 402, a second input of the motion estimator 436, and a second input of the disparity estimator 432. An output of the entropy coder 412 is available as an output of the encoder 400.

Figure 5:
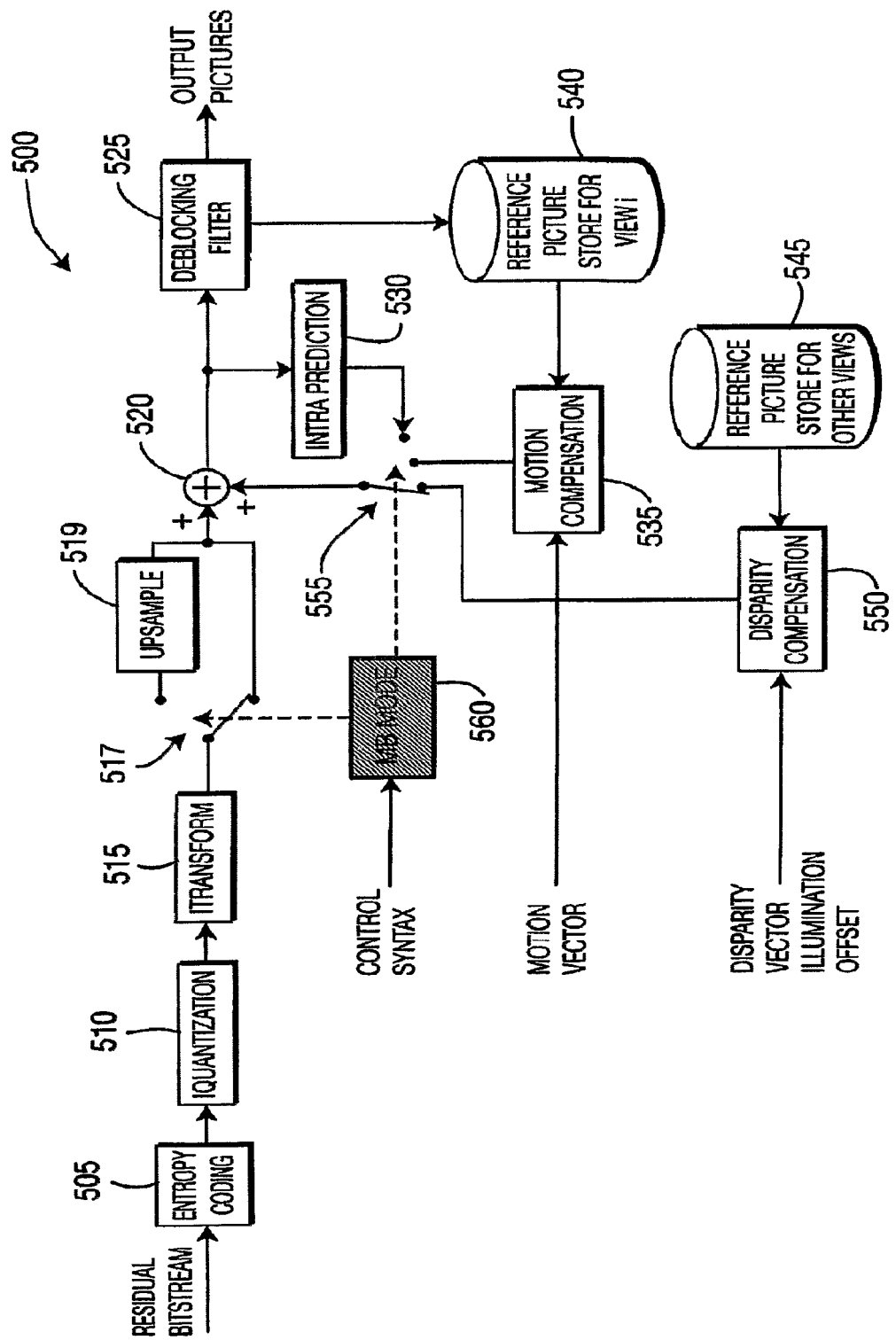
FIG. 5 is a block diagram for a Multi-view Video Coding (MVC) decoder supporting reduced resolution update mode is indicated generally by the reference numeral 500.

Turning to FIG. 5, a Multi-view Video Coding (MVC) decoder supporting reduced resolution update mode is indicated generally by the reference numeral 500. The decoder 500 includes an entropy decoder 505 having an output connected in signal communication with an input of an inverse quantizer 510. An output of the inverse quantizer is connected in signal communication with an input of an inverse transformer 515. An output of the inverse transformer 515 is connected in signal communication with an input of a switch 517. A first output of the switch 517 is connected in signal communication with an input of an upsampler 519. A second output of the switch 517 is connected in signal communication with a first non-inverting input of a combiner 520. The output of the upsampler 519 is connected in signal communication with the first non-inverting input of the combiner 520. An output of the combiner 520 is connected in signal communication with an input of a deblocking filter 525 and an input of an intra predictor 530. An output of the deblocking filter 525 is connected in signal communication with an input of a reference picture store 540 (for view i). An output of the reference picture store 540 is connected in signal communication with a first input of a motion compensator 535.

An output of a reference picture store 545 (for other views) is connected in signal communication with a first input of a disparity/illumination compensator 550.

An input of the entropy coder 505 is available as an input to the decoder 500, for receiving a residue bitstream. Moreover, an input of a mode module 560 is also available as an input to the decoder 500, for receiving control syntax to control which input is selected by the switch 555. Further, a second input of the motion compensator 535 is available as an input of the decoder 500, for receiving motion vectors. Also, a second input of the disparity/illumination compensator 550 is available as an input to the decoder 500, for receiving disparity vectors and/or illumination compensation syntax.

An output of a switch 555 is connected in signal communication with a second non-inverting input of the combiner 520.

A first input of the switch 555 is connected in signal communication with an output of the disparity/illumination compensator 550. A second input of the switch 555 is connected in signal communication with an output of the motion compensator 535. A third input of the switch 555 is connected in signal communication with an output of the intra predictor 530. An output of the deblocking filter 525 is available as an output of the decoder.

Embodiments of the present principles are directed to efficient encoding of Multi-view Video Coding (MVC) sequences. A multi-view video sequence is a set of two or more video sequences that capture the same scene from a different view point. Since multiple views of the same scene are expected to have a high degree of correlation, the present principles advantageously exploit view (or spatial) redundancy by performing prediction across different views.

Embodiments of the present principles are directed to the extension of Reduced Resolution Update (RRU) mode for Multi-view Video Coding (MVC), which combines both temporal prediction and view prediction. Initially, exemplary techniques to adapt RRU to MVC will be described and then exemplary applications in MVC. RRU is currently supported by the H.263 Recommendation and is extended to the MPEG-4 AVC standard. This mode provides the opportunity to increase the coding picture rate, while maintaining sufficient subjective quality. This is done by encoding an image at a reduced resolution, while performing prediction using a high resolution reference. This allows the final image to be reconstructed at full resolution and with good quality, although the bit rate required to encode the image has been reduced considerably.

Two exemplary embodiments are provided herein for extending reduced resolution update mode for Multi-view Video Coding. However, it is to be appreciated that given the teachings of the present principles provided herein, one of ordinary skill in this and related arts will contemplate these and various other similar embodiments for extending RRU for MVC, while maintaining the scope of the present principles.

Moreover, it is to be appreciated that the exemplary method provided herein, as well as those resulting from the teachings of the present principles provide herein, may be used for any video coding tools for MVC. However, for illustrative purposes, the exemplary embodiments described herein are so described with respect to the MPEG-4 AVC standard. Without loss in generality, we set rru_width_scale and rru_height_scale equal to two (2) for the exemplary cases described herein.

For each macroblock or sub-macroblock, MVC_prediction_flag is sent to indicate if it is coded as temporal prediction or view prediction. For the exemplary cases described herein, the basic coding macroblock unit is 32×32. Of course, the present principles are not limited to the preceding macroblock unit and other macroblock units may also be utilized in accordance with the teachings of the present principles, while maintaining the scope of the present principles.

A description will now be given regarding extending RRU to MVC in accordance with one embodiment of the present principles. In this embodiment, RRU is decided on a slice basis. In this embodiment, compared to RRU in the MPEG-4 AVC standard extension, which is also decided on slice-basis, inter motion compensation can be either from temporal prediction or view prediction. After motion compensation is performed, the residue is coded using RRU.

As for deblocking filter, since in RRU, the prediction process is now applied to block sizes of 8×8 and above, we also modify this process to only consider 8×8 block edges instead. It has been observed that RRU can be considered as an additional type of quantization. Therefore, to improve deblocking within RRU slices, if RRU is used, then quantizer values are virtually increased by a fixed value for purposes of accessing the deblocking tables. More specifically, we define indexA and indexB as follows:

$$indexA = Clip3(0,51,qP_{av} + RRUoffset + FilterOffsetA)$$

$$indexB = Clip3(0,51,qP_{av} + RRUoffset + FilterOffsetB)$$

where RRUoffset is the quantization offset we wish to apply in the presence of RRU.

However, it has been noticed that since the block and its neighbor can have a different view or temporal prediction, the boundary strength is adapted based on the MVC_prediction_flag across the boundaries.

Thus, when RRU is used for MVC, the deblocking should only consider 8×8 edges and the boundary strength and RRU offset should be combined together to adapt the strength of deblocking filter.

As for syntax, we add reduce_resolution_update_flag in the slice header to indicate if the slice uses RRU mode.

When reduce_resolution_update_flag is equal to 1, this specifies that RRU mode is applied in the current slice. When reduce_resolution_update_flag is equal to 0, this specifies that RRU mode is not applied in the current slice.

Figure 6:
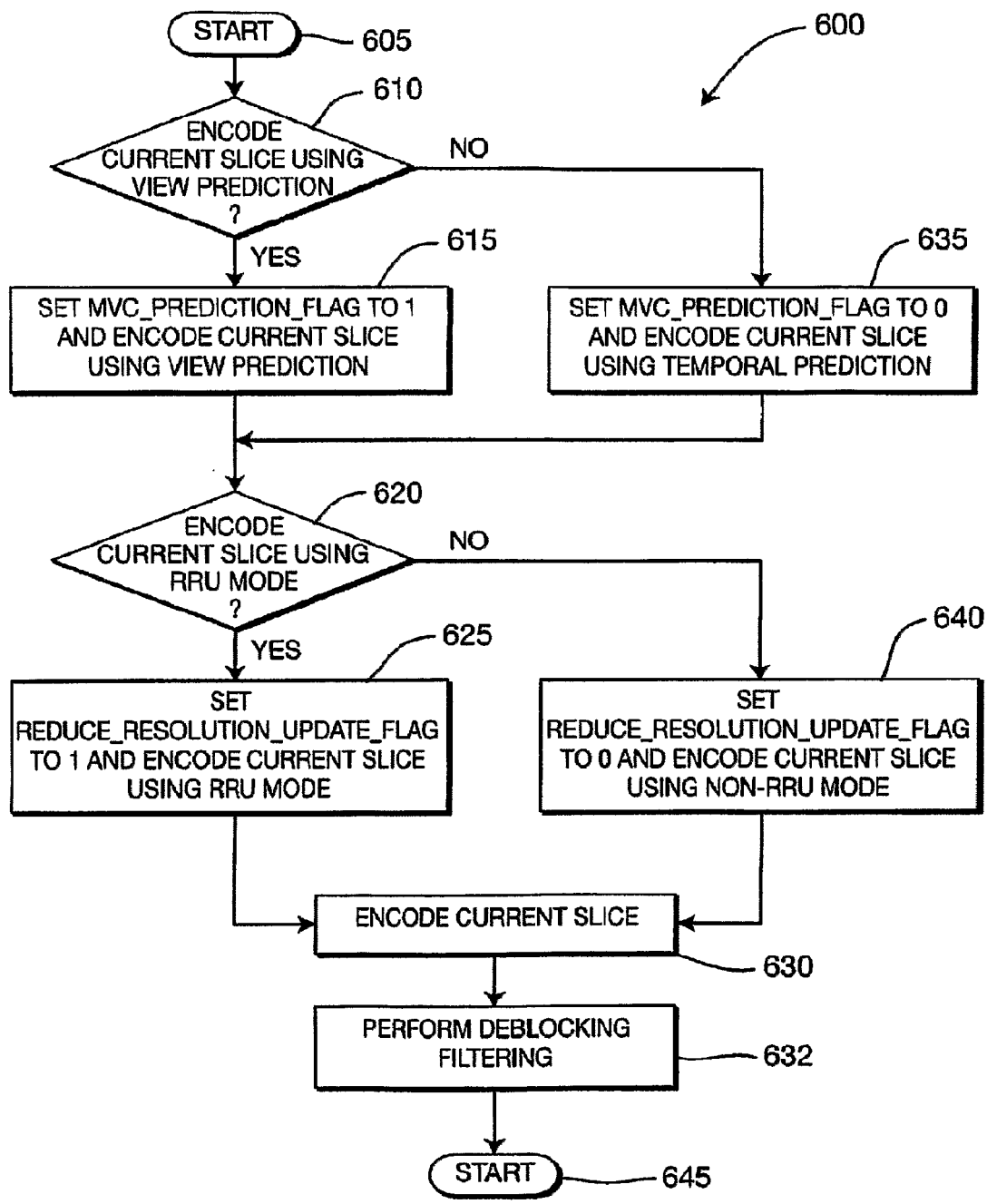
FIG. 6 is a block diagram for an exemplary Multi-view Video Coding (MVC) encoding method for a slice-based Reduced Resolution Update (RRU) mode is indicated generally by the reference numeral 600.

Turning to FIG. 6, an exemplary Multi-view Video Coding (MVC) encoding method for a slice-based Reduced Resolution Update (RRU) mode is indicated generally by the reference numeral 600. The method 600 includes a start block 600 that passes control to a decision block 605. The decision block 605 determines whether or not to encode a current slice using view prediction. If so, then control is passed to a function block 615. Otherwise, control is passed to a function block 635.

The function block 615 sets the MVC_prediction_flag to 1, encodes the current slice using view prediction, and passes control to a decision block 620. The decision block 620 determines whether or not to encode the current slice using RRU mode. If so, then control is passed to a function block 625. Otherwise, control is passed to a function block 640.

The function block 625 sets reduce_resolution_update_flag to 1, encodes the current slice using RRU mode, and passes control to a function block 630. The function block 630 encodes the current slice, and passes control to a function block 632. The function block 632 performs deblocking filtering, and passes control to an end block 645.

The function block 635 sets MVC_prediction_flag to 0, encodes the current slice using temporal prediction, and passes control to the decision block 620.

The function block 640 sets reduce_resolution_update_flag to 0, encodes the current slice using a non-RRU mode, and passes control to the function block 630.

Figure 7:
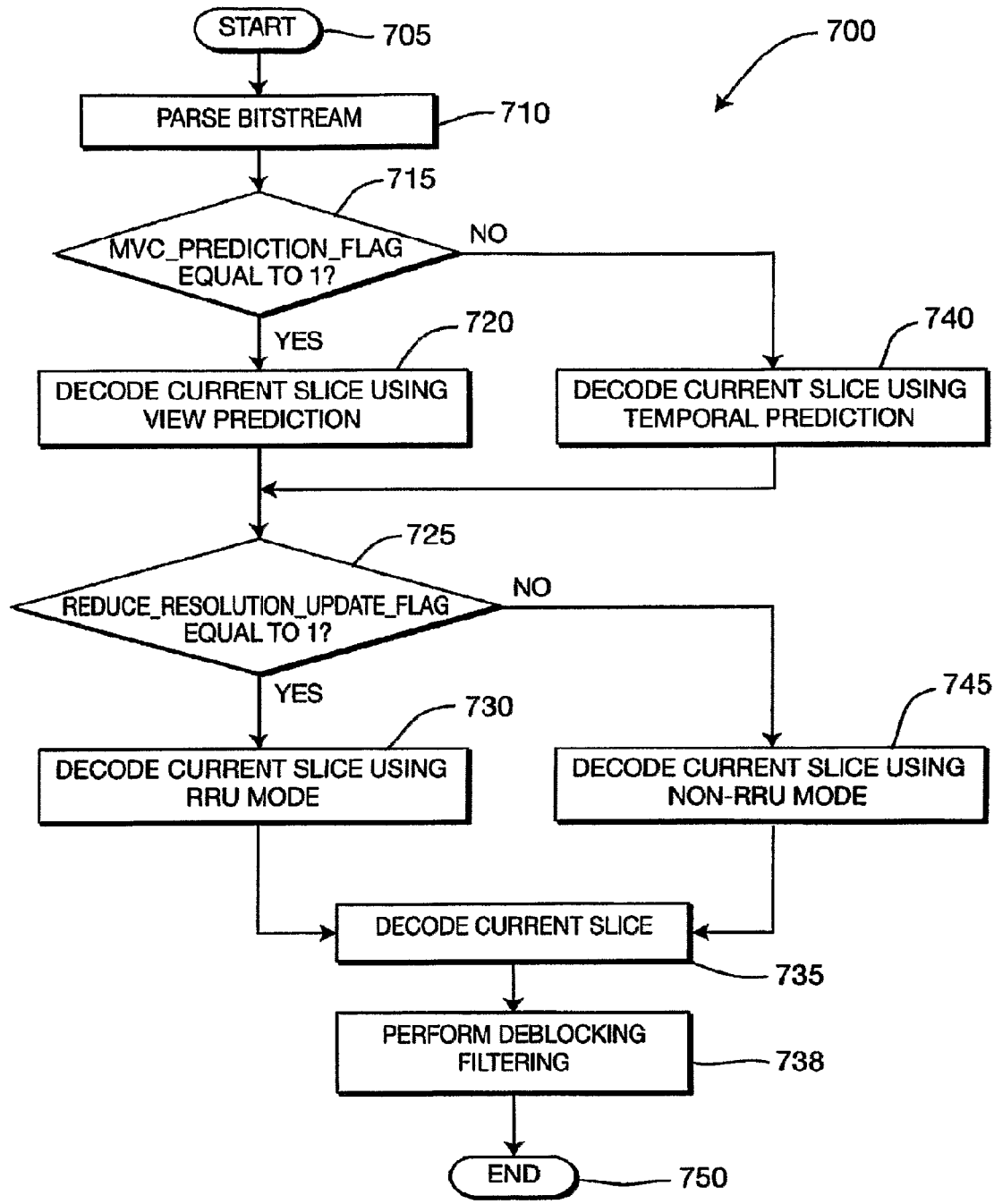
FIG. 7 is a block diagram for an exemplary Multi-view Video Coding (MVC) decoding method for slice-based Reduced Resolution Update (RRU) mode is indicated generally by the reference numeral 700.

Turning to FIG. 7, an exemplary Multi-view Video Coding (MVC) decoding method for slice-based Reduced Resolution Update (RRU) mode is indicated generally by the reference numeral 700. The method 700 includes a start block 705 that passes control to a function block 710. The function block 710 parses the bitstream, and passes control to a decision block 715. The decision block 715 determines whether or not MVC_prediction_flag is equal to 1. If so, then control is passed to a function block 720. Otherwise, control is passed to a function block 740.

The function block 720 decodes the current slice using view prediction, and passes control to a decision block 725. The decision block 725 determines whether or not reduce_resolution_update_flag is equal to 1. If so, then control is passed to a function block 730. Otherwise, control is passed to a function block 745.

The function block 730 decodes the current slice using RRU mode, and passes control to a function block 735. The function block 735 decodes the current slice, and passes control to a function block 738. The function block 738 performing deblocking filtering, and passes control to an end block 750.

The function block 740 decodes the current slice using temporal prediction, and passes control to the decision block 725.

The function block 745 decodes the current slice using a non-RRU mode, and passes control to the function block 735.

A description will now be given regarding extending RRU to MVC in accordance with another embodiment of the present principles. In this embodiment, RRU is decided on 32×32 MB basis, based on the MVC_prediction_flag.

In this embodiment, RRU can be switched on or off on a 32×32 MB basis, based on MVC_prediction_flag. For example, we can decide to use RRU for temporal prediction and non-RRU for view prediction. For simplicity, the MVC_prediction_flag can only be set on a 32×32 MB basis. If RRU is on, then we code one 32×32 MB as one MB. If RRU is off, then we code on a 32×32 MB as 4 16×16 MBs. The coding order is from left to right and up to down.

As for deblocking filter, we shall differentiate inner block edges from 32×32 MB boundaries. For inner block edges, if RRU mode is used, then deblocking filter is applied to 8×8 block edges and RRUoffset is applied as in above-described slice based method. If RRU mode is not used, then deblocking filtering is applied to 4×4 block edges. For a 32×32 MB boundary, if both of the neighboring blocks use RRU mode, then 8×8 block edges are considered and RRU offset is used. Otherwise, 4×4 block edges are considered and if one block uses RRU mode, then RRUoffset is applied.

As in the above-described slice-based method, for the 32×32 MB based method, we also adapt the boundary strength based on the MVC_prediction_flag across the boundaries.

As for slice header syntax, two syntaxes are added to indicate if RRU mode is applied for view prediction or temporal prediction.

When reduce_resolution_update_flag_for_view_prediction is equal to 1, this specifies that RRU mode is applied for a view prediction 32×32 macroblock in the current slice. When reduce_resolution_update_flag_for_view_prediction is equal to 0, this specifies that RRU mode is not applied for a view prediction 32×32 macroblock in the current slice.

When reduce_resolution_update_flag_for_temporal_prediction is equal to 1, this specifies that RRU mode is applied for a temporal prediction 32×32 macroblock in the current slice. When reduce_resolution_update_flag_for_temporal_prediction is equal to 0, this specifies that RRU mode is not applied for a temporal prediction 32×32 macroblock in the current slice.

Figure 8A:
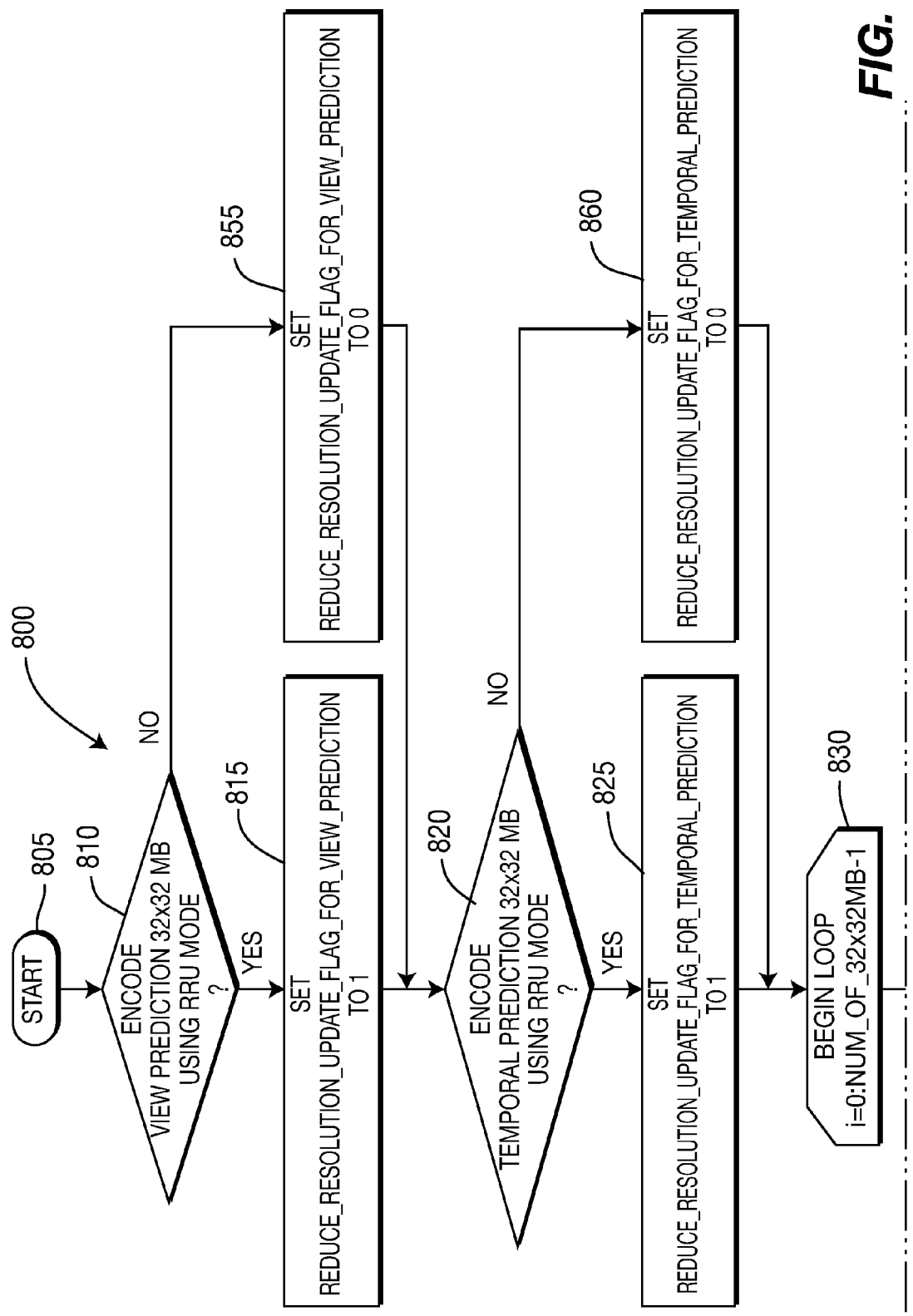
FIG. 8A-8B is a block diagram for an exemplary Multi-view Video Coding (MVC) encoding method for a 32×32 MB based on a Reduced Resolution Update (RRU) Mode is indicated generally by the reference numeral 800.
Figure 8B:
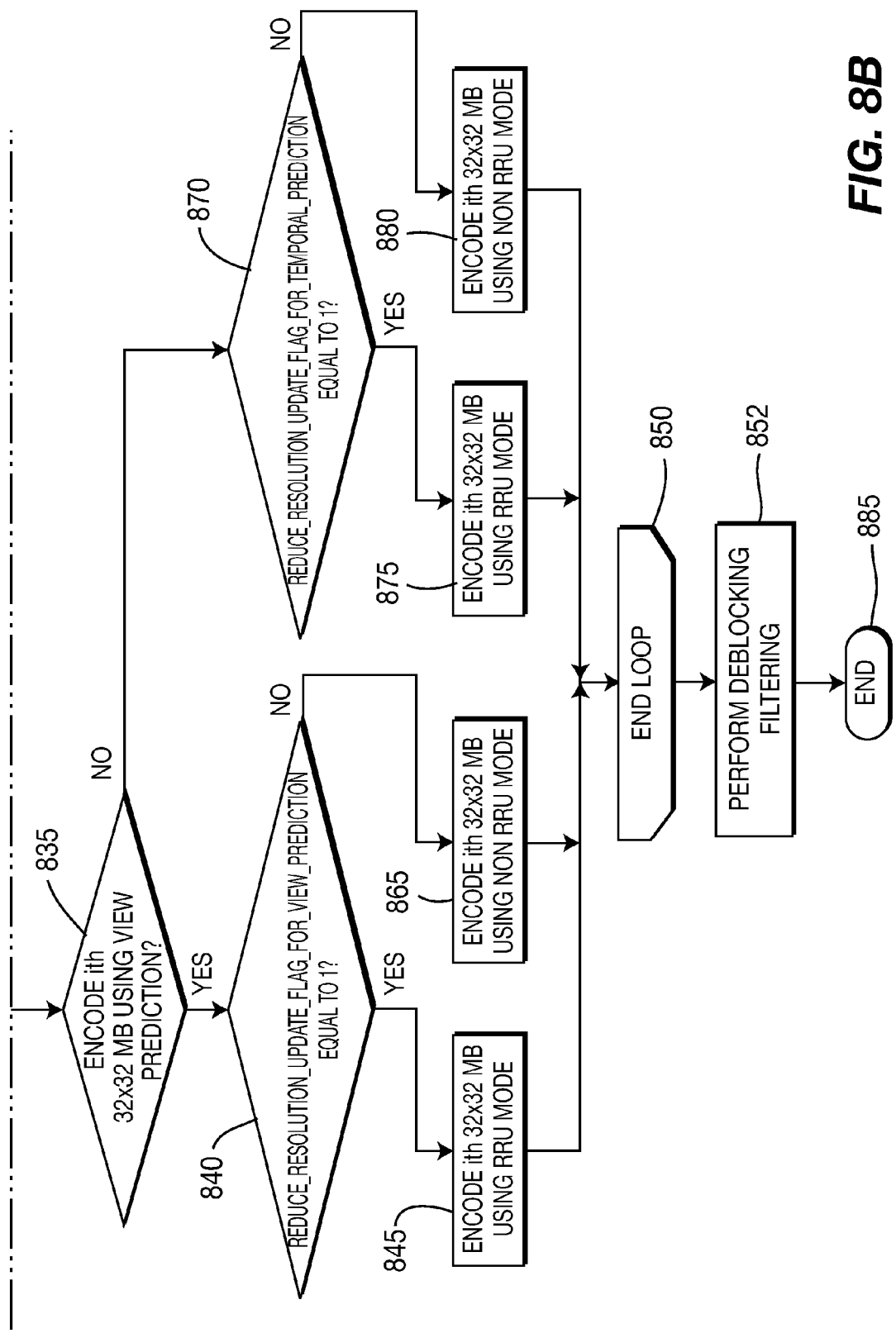

Turning to FIG. 8, an exemplary Multi-view Video Coding (MVC) encoding method for a 32×32 MB based on a Reduced Resolution Update (RRU) Mode is indicated generally by the reference numeral 800. The method 800 includes a start block 805 that passes control to a decision block 810. The decision block 810 determines whether or not to encode a view prediction of the 32×32 MB using RRU mode. If so, then control is passed to a function block 815. Otherwise, control is passed to a function block 855.

The function block 815 sets reduce_resolution_update_flag_for_view_prediction to 1, and passes control to a decision block 820. The decision block 820 determines whether or not to encode a temporal prediction for the 32×32 MB using RRU mode. If so, then control is passed to a function block 825. Otherwise, control is passed to a function block 860.

The function block 825 sets reduce_resolution_update_flag_for_temporal_prediction to 1, and passes control to a loop limit block 830. The loop limit block 830 begins a loop over each 32×32 MB including setting a range for the loop using a variable i=0 to num_of_32×32 MB-1, and passes control to a decision block 835. The decision block 835 determines whether or not to encode the ith 32×32 MB using view prediction. If so, then control is passed to a decision block 840. Otherwise, control is passed to a decision block 870.

The decision block 840 determines whether or not the reduce_resolution_update_flag_for_view_prediction is equal to 1. If so, then control is passed to a function block 845. Otherwise, control is passed to a function block 865.

The function block 845 encodes the ith 32×32 MB using RRU mode, and passes control to a loop limit bock 850. The loop limit block 850 ends the loop over each 32×32 MB, and passes control to a function block 852. The function block 852 performing deblocking filtering, and passes control to an end block 885.

The function block 855 sets reduce_resolution_update_flag_for_view_prediction to 0, and passes control to the decision block 825.

The function block 860 sets reduce_resolution_update_flag_for_temporal_prediction to 0, and passes control to the decision block 830.

The function block 865 encodes the ith 32×32 MB using a non-RRU mode, and passes control to loop limit block 850.

The decision block 870 determines whether or not the reduce_resolution_update_flag_for_temporal_prediction is equal to 1. If so, then control is passed to a function block 875. Otherwise, control is passed to a function block 880.

The function block 875 encodes the ith 32×32 MB using RRU mode, and passes control to the loop limit block 850.

The function block 880 encodes the ith 32×32 MB using a non-RRU mode, and passes control to the loop limit block 850.

Figure 9:
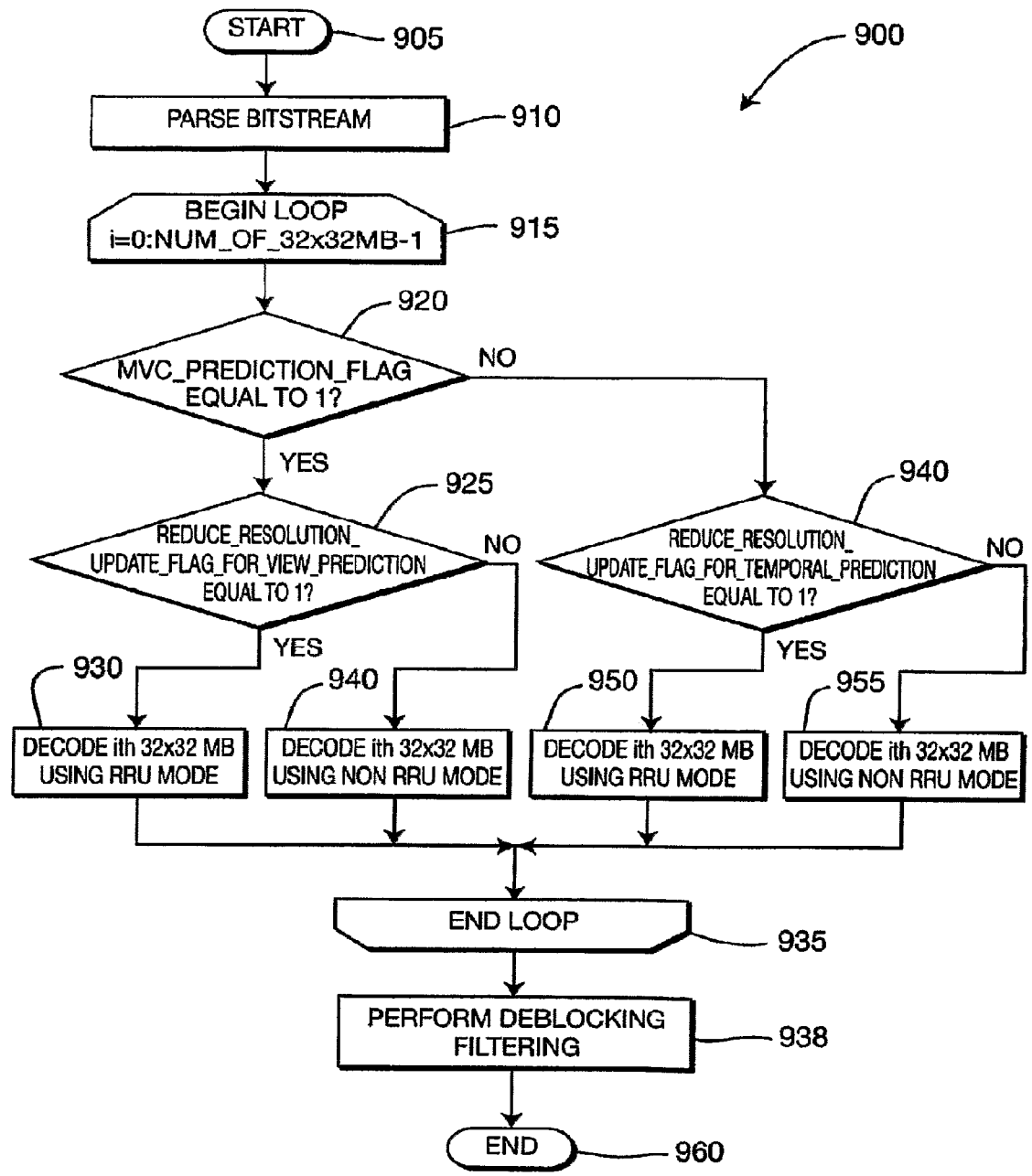
FIG. 9 is a block diagram for an exemplary Multi-view Video Coding (MVC) decoding method for a 32×32 MB based on a Reduced Resolution Update (RRU) Mode is indicated generally by the reference numeral 900.

Turning to FIG. 9, an exemplary Multi-view Video Coding (MVC) decoding method for a 32×32 MB based on a Reduced Resolution Update (RRU) Mode is indicated generally by the reference numeral 900. The method 900 includes a start block 905 that passes control to a function block 910. The function block 910 parses the bitstream, and passes control to a loop limit block 915. The loop limit block 915 begins a loop over each 32×32 MB including setting a range for the loop using a variable i=0 to num_of_32×32 MB-1, and passes control to a decision block 920. The decision block 920 determines whether or not MVC_view_prediction_flag is equal to 1. If so, then control is passed to a decision block 925. Otherwise, control is passed to a decision block 945.

The decision block 925 determines whether or not the reduce_resolution_update_flag_for_view_prediction is equal to 1. If so, then control is passed to a function block 930. Otherwise, control is passed to a function block 940.

The function block 930 decodes the ith 32×32 MB using RRU mode, and passes control to a loop limit block 935 that ends the loop over each of the 32×32 MBs, and passes control to a function block 938. The function block 938 performs deblocking filtering, and passes control to an end block 960.

The function block 940 decodes the ith 32×32 MB using a non-RRU mode, and passes control to the loop limit block 935.

The decision block 945 determines whether or not the reduce_resolution_update_flag_for_temporal_prediction is equal to 1. If so, then control is passed to a function block 950. Otherwise, control is passed to a function block 955.

The function block 950 decodes the ith 32×32 MB using RRU mode, and passes control to the loop limit block 935.

The function block 955 decodes the ith 32×32 MB using a non-RRU mode, and passes control to the loop limit block 935.

A description will now be given regarding applications for using RRU coded slices in MVC.

Although RRU mode was found useful in video coding, especially during the presence of heavy motion within the sequence, since it allowed an encoder to maintain a high frame rate (and thus improved temporal resolution) while also maintaining high resolution and quality in stationary areas, it can introduce certain artifacts or a lower objective PSNR due to non-invertibility of the downsampling and upsampling processes. With respect to using RRU in MVC, the following exemplary applications are presented: RRU can be used for non-referenced slices; RRU can be used for the views that can allow lower objective video quality; and RRU can be used for the temporal instance that can allow lower objective video quality. Of course, given the teachings of the present principles provided herein, other applications for using RRU in MVC may also be employed, while maintaining the scope of the present principles.

A description will now be given of some of the many attendant advantages/features of the present invention, some of which have been mentioned above. For example, one advantage/feature is a video encoder that includes an encoder for encoding a picture using a reduced resolution update mode. The picture is one of a set of pictures corresponding to multi-view content having different view points with respect to a same or similar scene. The picture represents one of the different view points.

Another advantage/feature is the video encoder as described above, wherein the reduced resolution update mode is used for at least one of view prediction and temporal prediction.

Yet another advantage/feature is the video encoder as described above, wherein the reduced resolution update mode is used on a slice basis.

Moreover, another advantage/feature is the video encoder that uses the reduced resolution update mode on a slice basis as described above, wherein the encoder applies a deblocking filtering operation to reduced resolution update block edges of a slice partitioned from the picture when the reduced resolution update mode is used for the slice, and a strength of the deblocking filtering operation is adapted based on at least one of the reduced resolution update mode and prediction information.

Further, another advantage/feature is the video encoder as described above, wherein the reduced resolution update mode is switched on and off based on a view prediction or a temporal prediction on a reduced resolution update macroblock basis.

Also, another advantage/feature is the video encoder that switches the reduced resolution update mode on and off as described above, wherein the encoder applies a deblocking filtering operation to the picture, and wherein inner block edges of the picture are differentiated from reduced resolution update macroblock boundaries when the deblocking filtering operation is applied.

Additionally, another advantage/feature is the video encoder that switches the reduced resolution update mode on and off and differentiates inner block edges as described above, wherein the deblocking filtering operation is applied to reduced resolution update block edges and a filter strength is adapted for the reduced resolution update mode when the reduced resolution update mode is used for the inner block edges, and the deblocking filtering operation is applied to 4×4 block edges when the reduced resolution update mode is without use.

Moreover, another advantage/feature is the video encoder that switches the reduced resolution update mode on and off and differentiates inner block edges as described above, wherein reduced resolution update block edges are deblock filtered and a filter strength is adapted for the reduced resolution update mode for a reduced resolution update macroblock edge boundary when two neighboring macroblocks use the reduced resolution update mode, and 4×4 block edges are deblock filtered and the filter strength is adapted for the reduced resolution update mode when at least one of the two neighboring blocks uses the reduced resolution update mode.

Also, another advantage/feature is the video encoder that switches the reduced resolution update mode on and off as described above, wherein the encoder applies a deblocking filtering operation to the macroblocks partitioned from the picture. The deblocking filtering operation has a filter strength adapted based on at least one of view prediction and temporal prediction.

Additionally, another advantage/feature is the video encoder as described above, wherein the encoder encodes the picture to provide a resultant bitstream compliant with at least one of the International Organization for Standardization/International Electrotechnical Commission Moving Picture Experts Group-4 Part 10 Advanced Video Coding standard/International Telecommunication Union, Telecommunication Sector H.264 recommendation and an extension thereto.

Moreover, another advantage/feature is the compliant video encoder as described above, wherein the encoder applies a deblocking filtering operation to the picture, the deblocking filtering operation having a filter strength adaptable based upon at least one of the reduced resolution update mode and prediction information.

Further, another advantage/feature is the video encoder as described above, wherein the reduced resolution update mode is used for a non-reference slice in the multi-view video scene.

Also, another advantage/feature is the video encoder as described above, wherein the reduced resolution update mode is used for at least some views in the multi-view video scene.

Additionally, another advantage/feature is the video encoder as described above, wherein the reduced resolution update mode is used for a particular temporal instance in the multi-view video scene.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims

The invention claimed is:

1. A video decoder, comprising:
a decoder for decoding a picture using a reduced resolution update mode, the picture being one of a set of pictures corresponding to multi-view content having different view points with respect to a same or similar scene, the picture representing one of the different view points wherein the reduced resolution update mode is used for at least one of view prediction and temporal prediction,
wherein the reduced resolution update mode is used on a slice basis; and
wherein said decoder applies a deblocking filtering operation to reduced resolution update block edges of a slice partitioned from the picture when the reduced resolution update mode is used for the slice, and a strength of the deblocking filtering operation is adapted based on at least one of the reduced resolution update mode and prediction information.

2. The video decoder of claim 1, wherein the reduced resolution update mode is used for a non-reference slice in the multi-view video scene.

3. The video decoder of claim 1, wherein the reduced resolution update mode is used for at least some views in the multi-view video scene.

4. The video decoder of claim 1, wherein the reduced resolution update mode is used for a particular temporal instance in the multi-view video scene.

5. A video decoder, comprising:
a decoder for decoding a picture using a reduced resolution update mode, the picture being one of a set of pictures corresponding to multi-view content having different view points with respect to a same or similar scene, the picture representing one of the different view points wherein the reduced resolution update mode is used for at least one of view prediction and temporal prediction, wherein said decoder applies a deblocking filtering operation to the picture, the deblocking filtering operation having a filter strength adaptable based upon at least one of the reduced resolution update mode and prediction information.

6. A video decoding method, comprising:
decoding a picture using a reduced resolution update mode, the picture being one of a set of pictures corresponding to multi-view content having different view points with respect to a same or similar scene, the picture representing one of the different view points wherein the reduced resolution update mode is used for at least one of view prediction and temporal prediction,
wherein the reduced resolution update mode is used on a slice basis; and
applying a deblocking filtering operation to reduced resolution update block edges of a slice partitioned from the picture when the reduced resolution update mode is used for the slice, and a strength of the deblocking filtering operation is adapted based on at least one of the reduced resolution update mode and prediction information.

7. The method of claim 6, wherein the reduced resolution update mode is used for a non-reference slice in the multi-view video scene.

8. The method of claim 6, wherein the reduced resolution update mode is used for at least some views in the multi-view video scene.

9. The method of claim 6, wherein the reduced resolution update mode is used for a particular temporal instance in the multi-view video scene.

10. A video decoding method, comprising:

decoding a picture using reduced resolution update mode, the picture being one of a set of pictures corresponding to multi-view content having different view points with respect to a same or similar scene, the picture representing one of the different view points wherein the reduced resolution update mode is used for at least one of view prediction and temporal prediction, wherein said decoding step decodes the picture to provide a resultant bitstream compliant with at least one of the International Organization for Standardization/International Electrotechnical Commission Moving Picture Experts Group-4 Part 10 Advanced Video Coding standard/International Telecommunication Union, Telecommunication Sector H.264 recommendation and an extension thereto, further comprising applying a deblocking filtering operation to the picture, the deblocking filtering operation having a filter strength adaptable based upon at least one of the reduced resolution update mode and prediction information.

* * * * *